Oct. 21, 1958 R. F. HORTON 2,856,973
TWIN MITERING CUT-OFF SAWS
Filed April 18, 1955 3 Sheets-Sheet 3

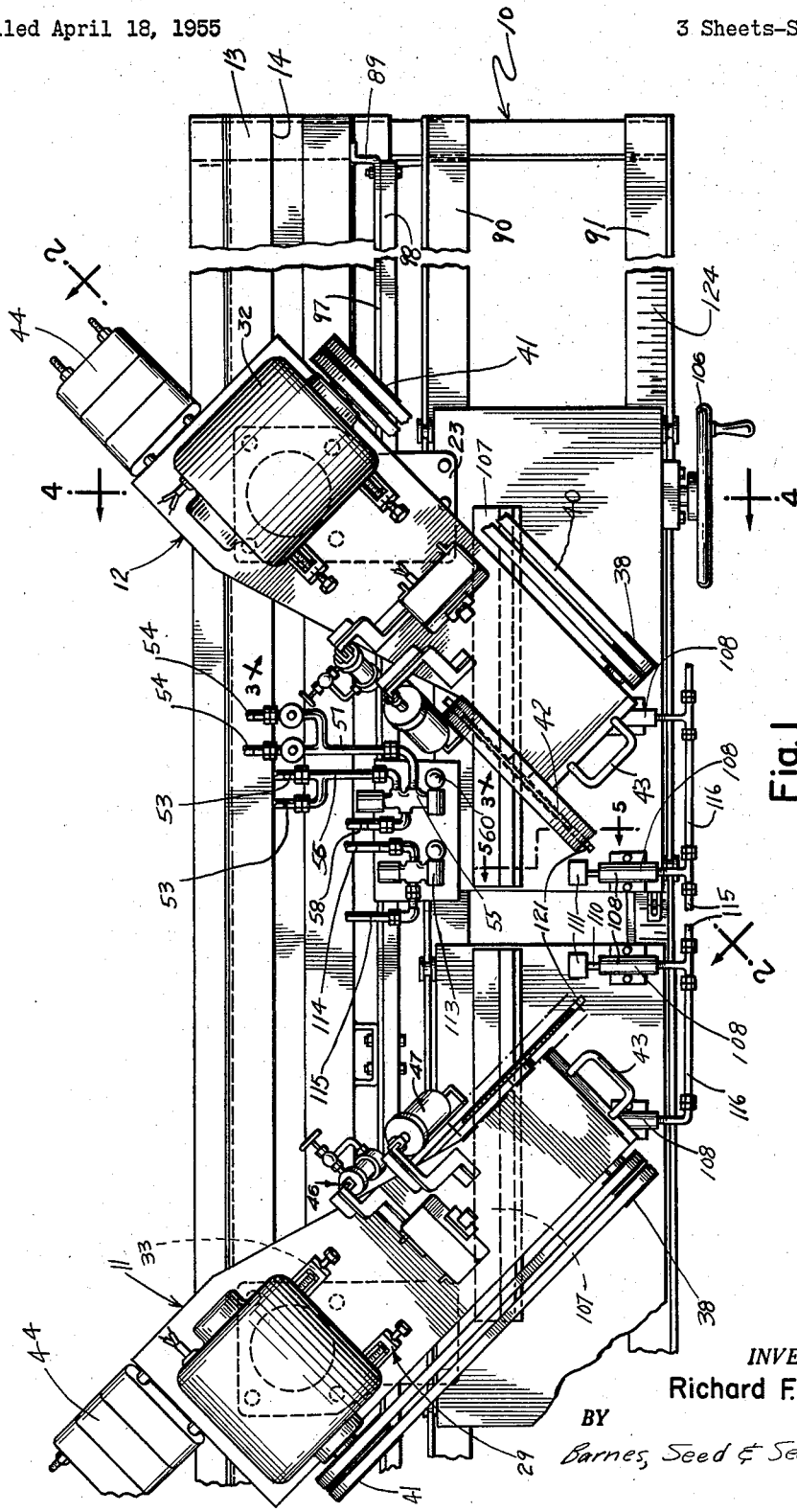

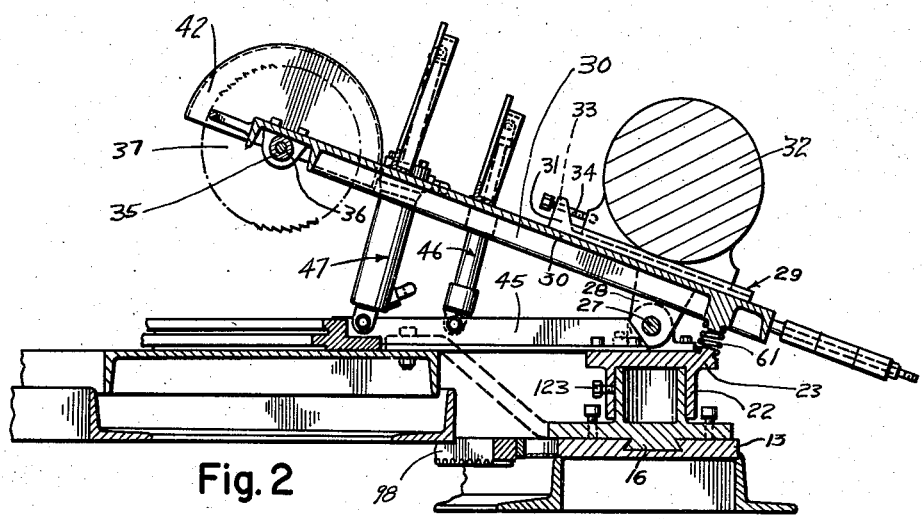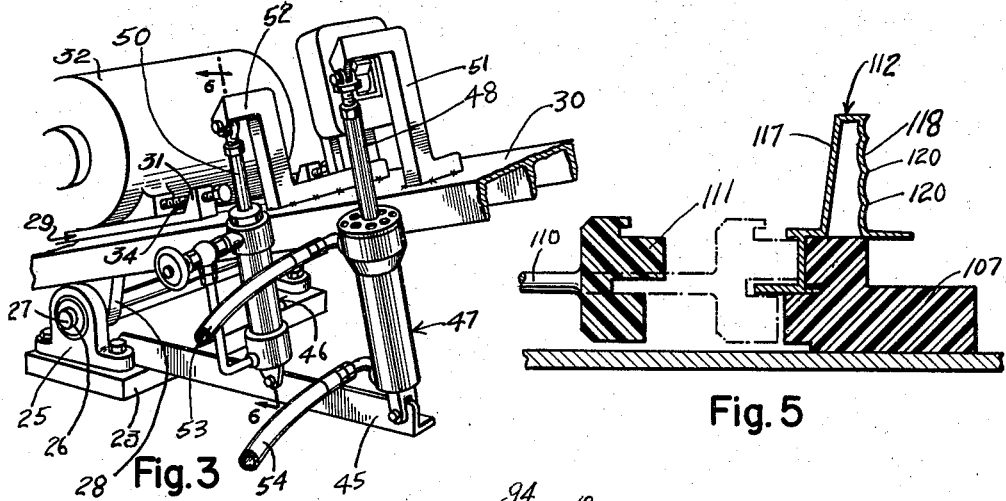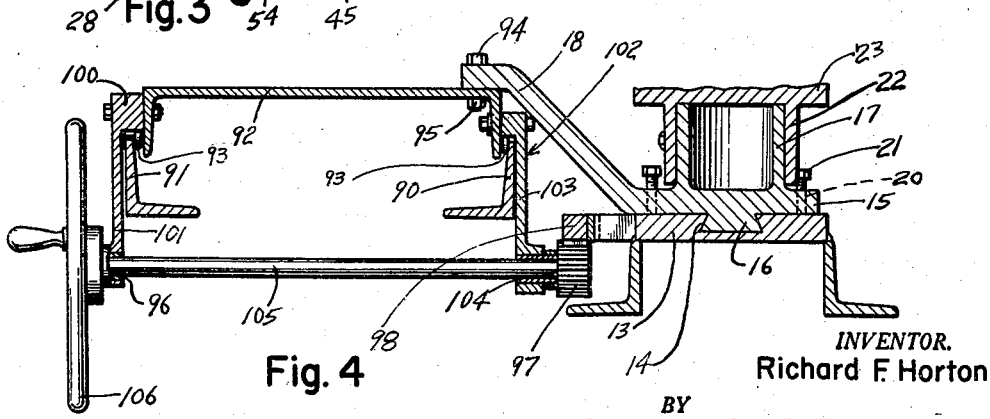

INVENTOR.
Richard F. Horton
BY
*Barnes, Seed & Secrest*

2,856,973

TWIN MITERING CUT-OFF SAWS

Richard F. Horton, Seattle, Wash.

Application April 18, 1955, Serial No. 501,805

4 Claims. (Cl. 143—38)

This invention relates to cut-off saws and, more particularly to two aligned saws arranged to cut at predetermined angles on the same structural member preparatory to miter-joining such member with juxtapositioned complementary members.

In the art of casement windows, especially in aluminum casement windows, the conventional practice at the present is for abutting stile and rail members to meet at a miter joint. The cut-off machinery normally employed for making a miter cut on these members is a single circular saw with associated dies arranged to position the member at an angle of 45° with respect to the plane of the circular saw. Employment of such a single saw is wasteful in regard to lost motion, time, and expense of manufacture. For example, after one end of the structural member has been prepared with a miter cut it is necessary to lay down this member, measure the desired length of the next miter cut on said member, and then cut off the other end. As this process of making a member having miter cuts on each end is subject to error in respect to the length of the member as well as time-consuming, I have perfected a miter cut-off saw apparatus having two aligned cut-off saws which are capable of simultaneously cutting the structural member as well as being accurately spaced apart from each other. Accordingly, it is an object of this invention to provide a miter saw which simultaneously cuts both ends of the member and thereby eliminates the time-consuming handling of said member.

A further object of this invention is the provision of cut-off saws for making miter cuts on a structural member and which saws are accurate both in regard to the angle of the cut and to the length of the structural member.

An additional object is the provision of a miter saw machine having a high production rate in the manufacturing of structural members of a predetermined length and whose ends are cut to a predetermined angle.

A still further and important object is the provision of a miter saw for cutting a member to a predetermined length with the ends of a desired angle, and which saw is both labor-saving and time-saving.

Other more particular objects and advantages will, together with these general objects, appear and be understood in the course of the following description and claims, the invention consisting in the novel construction and in the adaptation and combination of parts hereinafter described and claimed.

In the accompanying drawings:

Figure 1 is a fragmentary plan view of the two miter saws with a portion of the supporting frame broken away.

Fig. 2, drawn on line 2—2 of Fig. 1, is a longitudinal side elevational view of the movable cut-off saw and its supporting platform, and is taken at a 45° angle across the supporting frame.

Fig. 3 is a fragmentary perspective view of the rotatable platform, and is drawn on line 3—3 of Fig. 1.

Fig. 4 is a fragmentary transverse vertical sectional view of the supporting frame and is drawn on line 4—4 of Fig. 1.

Fig. 5 is a fragmentary transverse vertical sectional view of a die-jig and clamping block drawn on line 5—5 of Fig. 1, and illustrates a member held by a clamp, in phantom, in said jig.

Figure 6:
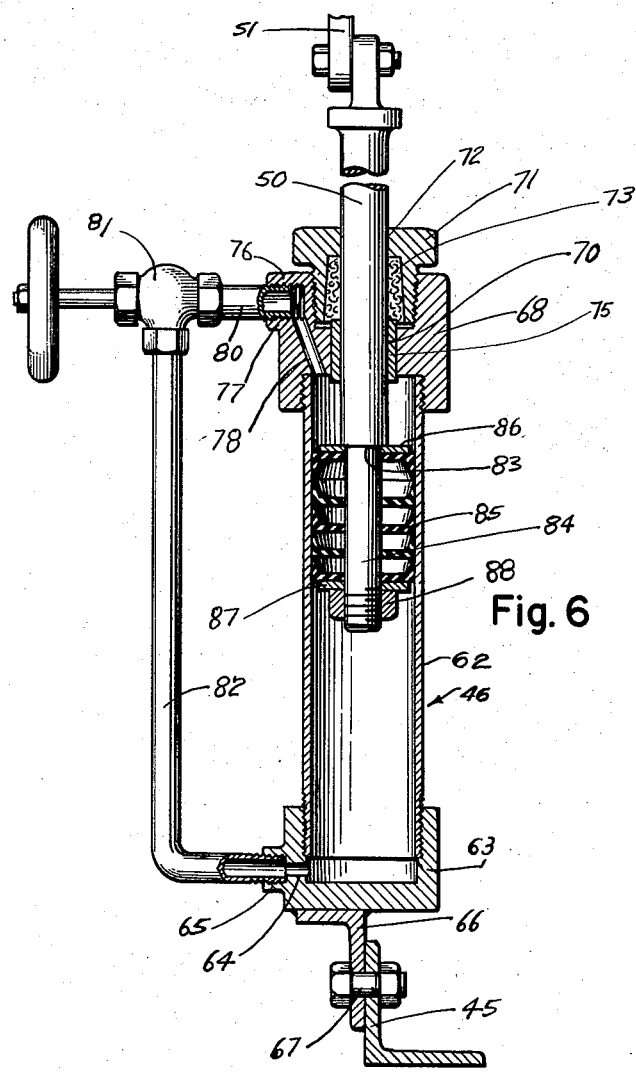
Fig. 6 is a longitudinal vertical sectional view of an oil check cylinder and is drawn on line 6—6 of Fig. 3.

Referring now to the drawings, it is seen that the invention comprises twin miter cut-off saw assemblies mounted on a work bench 10, the legs of which are not illustrated. One of these assemblies 11 is in a fixed position and the other assembly 12 is adapted to move in a rectilinear path with respect to the fixed assembly in order to vary the spacing between them. Integral with and supported by the work bench, and running substantially the entire length of said bench, is a dovetail way 13 having a mortise 14. Mounted in this way are two carriages 15 having a dovetail tenon 16 on the under side, an upstanding circular tubular chimney 17 on the upper side, and an arm 18 projecting upwardly and toward the front of the work bench as best shown in Fig. 4. Spaced around the base of each carriage at the corner thereof are four tapped bolt apertures 20 having screwed therein bolts 21. The carriage 11 is fixed in the way by tightening these bolts, and the carriage 12 is left free to move.

Turning now to the saw assemblies proper and a detailed description of the same, identical reference numerals are employed for corresponding elements on both the fixed and movable saw assemblies as these two assemblies are mirror images. A tubular support 22 on the under side of a mounting block 23 co-fits over the upstanding support 17 in a female to male relation. Mounted on block 23 are two spaced-apart bearing assemblies 25 each including a bearing 26. Journaled in these bearings is a shaft 27 which is integral with and passes through trunnions 28 under the saw platform 30. This platform, as is readily seen from the combination of the bearing assembly, shaft, and trunnions, is rotatable in a vertical direction. On the upperside of this platform and near the back of the same is a slide mount 29 for an electric motor 32. Said mount has two ears 31 with a tapped opening 33 passing through each ear, and a threaded bolt 34 screws through each opening and is integrally connected with the motor. By adjusting the position of the bolts in said openings it is possible to also adjust the position of the motor on the platform. At the forward end of and on the under side of the platform are spaced-apart bearing assemblies for shafts 36. Said shaft protrudes beyond the platform on each side and mounted on the inner end of the shaft, i. e., the end nearer the other saw assembly, is a circular saw 37 while on the outer end of the shaft, or that end away from the other saw assembly, are mounted pulleys 38. Appropriate endless belts 40, for transmitting energy from the motor to the saw, pass between the pulleys 38 (Fig. 1) and pulleys 41 mounted on the electric motor's rotor shaft. For protective purposes a semi-circular housing 42 covers the upper-half of the saw and does not interfere with the operation of said saw. On the inner edge of the platform 30 is a U-shaped handle 43 to assist in the manual raising and lowering of the saw platform, and on the back of the platform is a counterweight 44.

Also on the mounting block 24 is an arm 45 (Figs. 2 and 3) of angle iron which projects forwardly of the mount and under the platform 30, and in turn this arm is a mount for the lower ends of a pneumatic lift cylinder 47 and an oil check cylinder 46. The pneumatic lift cylinder and the oil check cylinder each have a piston rod 48 and 50, respectively. The upper end of the piston rod 48 is swivel-connected with a brace 51 and the upper end of the piston rod 50 is swivel-connected to a brace 52. The lower ends of these braces are welded to the upper surface of the platform 30. As is readily evidenced by the drawings, said arm and the two cylinders 46 and 47 are on the inner side of the platform or that side facing the other platform. Connecting with the pneumatic lift cylinder 47 are two air hoses 53 and 54, and which hoses also connect with an air control valve 55 (Fig. 1) by means of Y-tubes 56 and 57. This valve in turn connects with a source of compressed fluid such as a cylinder of compresesd air, not illustrated, by a tube 58. On the fore part of the valve is a handle 60 for controlling the flow of fluid to the pneumatic air cylinder and thereby controlling the lowering and the raising of the rotatable saw platform. A short spiral spring 61 (Fig. 2) is interposed between the movable platform 30 and the back of the base member 23 to positively assure the rise of said saw platform upon the cutting off of the source of the compressed gas.

The oil check cylinder 46 in addition to the shaft 50 comprises a cylinder 62 which is externally threaded at each end. Screwed over the lower end of the cylinder is an internally threaded cap 63 which has a lateral passage 64. Integral with said cap and surrounding the outer opening of the passage 64 is an internally threaded nipple 65, and welded onto the bottom of the cap is an angle 66 having a passage through the free leg and which passage registers with a passage in the arm 45 for reception of a bolt 67. The upper end of the cylinder is also externally threaded and fitting over the same end is an internally threaded cap 68 having a center passage 70 through which passes the upper section of the shaft 50. This cap on the outer part is cupped and also externally threaded for reception of a co-fitting externally threaded plug 71. In turn this plug has an opening 72 through which passes said shaft. The bottom central section of this plug is internally cupped for reception of packing 73. This packing in addition to preventing the passage of air into and out of the cylinder also retains sleeve 75, surrounding the upper end of the shaft in the passage 70, in position. Said cap 68 on the upper edge also has a nipple 76 having an internally threaded passage 77. And interconnecting the inner end of this passage and the interior of the cylinder is an angularly extending passage 78 in said cap. In order to form an enclosed oil circulatory system is an externally threaded pipe 80 screwed into nipple 76 which interconnects the upper passage 78 with a valve 81 and an externally threaded pipe 82 screwed into nipple 65 interconnects the lower passage 64 with said valve. Returning now to the shaft 50, the same is stepped at 83 and is reduced in diameter to form lower end 84. Surrounding said lower end are a number of flexible cups 85, and which are manufactured out of neoprene. These cups are in transverse relationship with the longitudinal axis of the shaft, and are free to slide on the lower end of the same. Also, these cups are prevented from sliding off of 84 by an upper washer 86 juxtapositioned to the step 83 and a lower washer 87 held in place by nut 88 on the lower threaded extremity of 84. The majority of these cups and especially those on the lower part of the shaft present a concave face to the upper end of the cylinder, i. e., that end of the cylinder through which the shaft passes. In contrast to this arrangement the uppermost cup presents a concave face to the majority of the cups or to the lower end of the cylinder. This arrangement of the cups is beneficial to a regulated uniform lowering of the platform 30 as the platform and saw are precluded from slamming down on the member undergoing sawing. To be more explicit, if the saw is being lowered the shaft is progressing into the cylindrical casing 62. The majority of the cups 85 will then cup inwardly and offer little resistance to the oil in the cylinder flowing past. However, the uppermost cup will expand and offer a slight resistance to the flow of oil past it and by such action will slow down the rate of the lowering of the saw. Conversely, when the platform raises the uppermost cup offers only a token resistance to the oil flow while the majority of the cups spread out to offer a resistance to the oil flow resulting in a moderate and uniform rate of rise of the saw platform.

Returning now to the work bench there are mounted on said bench and forwardly of the dovetail ways two guide rails 90 and 91 (Figs. 1 and 4) with the former interspaced between the latter and the dovetail ways. Two jig platforms 92 having grooved rollers 93 are mounted on these rails with the grooves of the rollers resting on the upper edge of the rails. Each of these platforms is made integral with one of the arms 18 by a nut 94 and a bolt 95. In the case of the permanently fixed carriage the attached jig platform is correspondingly permanently fixed and in the case of the movable carriage the attached jig platform is movable in correspondence to the movement of said carriage. Provision for moving the movable carriage and the related jig platform include a rack rail 98 and a pinion gear 97. Attached to the dovetail way 13 between the same and the guide rail is a U-shaped support 89 with the base of the support in a spaced-apart relation to the way. Integral with this support is the rack rail 98, and which rail need run only from the movable carriage end of the work bench to the inner end of the fixed jig platform. Naturally, the length of the rack bar will vary with each cut-off saw machine as each machine can have a work bench of any reasonable length. Attached to the front outer edge of the movable jig platform 92 is a supporting member having a base 100 and a leg 101 depending therefrom. Said leg is on the outside of the outer guide rail 91 and includes in the lower extremity a bearing 96. On the inner edge of said jig platform and between the inner guide rail 90 and the dovetail way is another support 102 having a depending leg 103 with a bearing 104 near the lower end. Journaled in both of these bearings 96 and 104 and extending under the movable platform is a shaft 105. On the inner end of this shaft is the pinion gear 97 which registers with the rack rail while on the outer end is a handwheel 106.

Mounted on each of the platforms 92 toward the rear of the same is a die-jig 107 (Figs. 1 and 5). Also mounted on each of the platforms are two pneumatic vise cylinders 108, one near the front and the inner edge and the other near the front edge and at approximately the midpoint of the platform. Each pneumatic vise comprises a shaft 110 adapted to move in the vise cylinder and away from and toward its respective die-jig. On the free end of each shaft is a holding-die block 111 for retaining a structural member 112 such as a lower rail of a casement type window in the die-jig. As evidenced by the drawings, the die block and the die-jig are of complementary configurations with respect to a third member to be held by them, the jig being of metal and the block of either a metal or a plastic. A valve 113 regulates the operation of these cylinders, and by flexible tube 114 connects with a source of compressed fluid like compressed air. And, by another flexible tube 115 and a rigid tube 116, said valve connects with the pneumatic vise cylinders on the platform.

Digressing for a moment a word will be mentioned in regard to the previously referred-to structural member 112. Said member is normally used as the lower rail of a casement-type window generally manufactured from aluminum. An important feature of such a rail is the abutting edge 117 which overhangs the exterior of a building in which the window is installed. Said edge has an underside 118 comprising a series of adjacent arches and which run parallel to the longitudinal axis of the rail. At each juncture of the adjacent arches there is a sharp and definite cusp 120 which prevents moisture from running along said underside and working its way into the building. Such action is brought about by the moisture collecting on the cusps 120 and then because of the force of gravity falling off of the same.

Returning now to the platforms 92 and the die-jigs 107, each of the latter are comprised of two separate members which are separated by a distance somewhat greater than the thickness of the saw blade. In this particular instance the ends of the die-jigs facing each other are at an angle of 45° with respect to the longitudinal axis of the jigs and are parallel to each other. The platform proper has a slot 121 directly under this separation of the two die-jigs and which slot extends from near the back edge of the platform to approximately the platform's inner edge facing the other platform. This slot is at an angle of 45° with respect to the longitudinal axis of the jigs and the platform. As is readily recognized the reason for separating the jig members and for having the slot in the platform is to permit the cutting edge of the circular saw to penetrate below the table level of the platform thereby insuring that the member retained in the jigs is cut through. Although the angle of cutting has been described as 45° with respect to the longitudinal axis of the platform it is to be realized that the angle of cutting may be some other angle and that appropriate die-jigs and platforms can be adopted for such angle. The saw platform and saw can be rotated for conforming with this new angle of cutting by adjusting the set screw 123 (Fig. 2) on the base member 23.

On the upper face of the horizontal leg of the angle 91 is a scale 124. In operating this cut-off saw the movable platform is moved the distance required from the fixed platform as indicated by said scale, and then a structural member positioned in the die-jigs. It is possible to lower the two cut-off saws simultaneously for cutting the ends of the member by actuating the control valve 55. Or, one saw at a time can be lowered by pulling down on the handle 43. In either case the miter-cutting of the ends of the member eliminates, as compared with a single saw, the removal of the member from the jig, the measuring of the required length, the readjusting of the member in the jig, and the second sawing of the same. Furthermore, this single handling of the member reduces the possibility of introducing error as compared with multi-handling of previous methods.

Although this invention has been described in terms of circular saws it is to be understood that another saw or a circular grinding wheel may also be employed.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a miter cut-off saw for cutting off the ends of a member at predetermined angles, a support, a movable platform defining a work plane, two rotary cut-off saw assemblies pivotally mounted for unitary swinging movement toward and away from said work plane in respective cutting paths both perpendicular to the work plane and intersecting the latter in correspondence with said predetermined angles, one of said saws being mounted on said platform and the other being carried by said support free of the platform, means for selectively moving said platform along a linear path which is intersected by said cutting paths, means for holding said member on said platform in a position to be engaged by the cut-off saws simultaneously when such are moved toward said work plane, and hydraulic power means operatively associated with said saw assemblies for moving the latter in unison through their cutting paths.

2. The structure of claim 1 in which hydraulic check means is operatively associated with said saw assemblies for regulating the speed with which the cut-off saws swing toward the working plane.

3. The structure of claim 2 in which said hydraulic power means and said hydraulic check means are both located on the same side of the swing axes of said saw assemblies.

4. The structure of claim 1 in which said hydraulic power means is controlled by a control valve located remote to said platform.

References Cited in the file of this patent

UNITED STATES PATENTS

| Number | Name | Date |
|---|---|---|
| 89,627 | Brown | May 4, 1869 |
| 701,623 | Sandstrom | June 3, 1902 |
| 722,197 | Schneider | June 23, 1903 |
| 815,028 | Morris | Mar. 13, 1906 |
| 874,510 | Johnston | Dec. 24, 1907 |
| 891,405 | Cassens | June 23, 1908 |
| 1,373,315 | Dunn | Mar. 29, 1921 |
| 1,463,791 | Brekelmans | Aug. 7, 1923 |
| 1,467,945 | Moore et al. | Sept. 11, 1923 |
| 1,746,594 | Jacobson | Feb. 11, 1930 |
| 2,234,533 | Nolan | Mar. 11, 1941 |
| 2,371,401 | Martin | Mar. 13, 1945 |
| 2,635,720 | Kolkey et al. | Apr. 21, 1953 |

FOREIGN PATENTS

| Number | Country | Date |
|---|---|---|
| 659,179 | Germany | July 12, 1940 |